(12) United States Patent
de Montmorillon et al.

(10) Patent No.: US 6,510,268 B1
(45) Date of Patent: Jan. 21, 2003

(54) OPTICAL FIBER FOR COMPENSATING THE CHROMATIC DISPERSION OF AN OPTICAL FIBER HAVING POSITIVE CHROMATIC DISPERSION

(75) Inventors: Louis-Anne de Montmorillon, Paris (FR); Pascale Nouchi, Maisons Laffitte (FR); Pierre Sillard, Paris (FR); Ludovic Fleury, Bois D'Arcy (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/653,803

(22) Filed: Sep. 1, 2000

(30) Foreign Application Priority Data

Sep. 2, 1999 (FR) .......................................... 99 11 009

(51) Int. Cl.$^7$ ................................................ G02B 6/16
(52) U.S. Cl. ........................ 385/123; 385/126; 385/127
(58) Field of Search ................................ 385/123, 126, 385/127, 124, 125, 128

(56) References Cited

U.S. PATENT DOCUMENTS 5,838,867 A 11/1998 Onishi et al.

FOREIGN PATENT DOCUMENTS

EP 0 940 697 A1 9/1999
WO WO 99/42869 8/1999

OTHER PUBLICATIONS

Onishi, M. et al: "Third-order Dispersion Compensating Fibres for Non-Zero Dispersion Shifted Fibre Links" Electronics Letters, GB, IEE Stevenage, vol. 32, No. 25, Dec. 5, 1996, pp. 2344–2345, XP000685332 ISSN: 0013–5194.
Arai, S. et al.: "Low Nonlinear Dispersion-Shifted Fiber" OFC, Optical Fiber Communication, Conference Technical Digest Series, US, Washington, DC, Feb. 16, 1997, p. 66, XP00078397.

*Primary Examiner*—Ellen E. Kim
(74) *Attorney, Agent, or Firm*—Sughrue Mion, PLLC

(57) ABSTRACT

The invention relates to an optical fiber for compensating, in-line, for the chromatic dispersion of an optical fiber having positive chromatic dispersion. For a wavelength of 1550 nm, the optical fiber of the invention advantageously has chromatic dispersion that is negative and greater than –40 ps/(nm.km), a chromatic dispersion gradient that is negative, a chromatic dispersion to chromatic dispersion gradient ratio that is in the range 50 nm to 230 nm, an effective area that is greater than 10 $\mu m^2$, and bend losses that are less than or equal to 0.05 dB; and a cutoff wavelength that is greater than or equal to 1.1 $\mu$m. It makes it possible to compensate for the cumulative chromatic dispersion in a line fiber of the NZ-DSF type having positive chromatic dispersion. The invention also relates to an optical fiber transmission system using such a fiber to compensate, in-line, for the cumulative chromatic dispersion in the line fiber.

84 Claims, 2 Drawing Sheets

OPTICAL FIBER FOR COMPENSATING THE CHROMATIC DISPERSION OF AN OPTICAL FIBER HAVING POSITIVE CHROMATIC DISPERSION

BACKGROUND OF THE INVENTION

The present invention relates to optical fiber transmission.

The refractive index profile of an optical fiber is generally described as a function of the appearance of the graph of the function that associates the refractive index with the radius of the fiber. Conventionally, distance r to the center of the fiber is plotted along the x-axis, and difference between refractive index and the refractive index of the cladding of the fiber is plotted up the y-axis. Thus, the terms "step", "trapezium", or "triangle" profiles are used for graphs respectively having step, trapezium or triangle shaped profiles. The curves are generally representative of the ideal or reference profile of the fiber, it being possible for the stresses induced during manufacture of the fiber to give rise to a profile that is significantly different.

In new high data rate and wavelength division multiplexed (WDM) networks, it is advantageous to control chromatic dispersion, in particular for data rates greater than or equal to 10 gigabits per second (Gbit/s), so that, for all of the wavelength values of the multiplex, chromatic compensation is obtained over the link that, cumulatively, is substantially zero, so as to limit the spreading of the pulses. A cumulative value of a few hundred ps/nm is generally acceptable for the dispersion. In the vicinity of the wavelengths used in the system, it is also advantageous to avoid zero values for the chromatic dispersion, since non-linear effects are then greater. Finally, it is also advantageous to limit the chromatic dispersion gradient over the range of the multiplex so as to avoid or to limit distortion between the channels of the multiplex.

Conventionally, step-index fibers are used as the line fibers for optical fiber transmission systems. Under reference ASMF 200, the Applicant sells a step-index monomode fiber having a chromatic dispersion zero wavelength $\lambda_0$ in the range 1300 nm to 1320 nm, and chromatic dispersion that is less than or equal to 3.5 ps/nm.km in a range from 1285 nm to 1330 nm, and that is 17 ps/nm.km at 1550 nm. The chromatic dispersion gradient at 1550 nm is about 0.06 ps/nm².km.

Dispersion shifted fibers (DSF) have also appeared on the market. Those fibers are such that, at the transmission wavelength at which they are used, which is in general different from the 1.3 µm wavelength for which the dispersion of silica is substantially zero, the chromatic dispersion of the transmitted wave is substantially zero. In those fibers, the index difference Δn between the core of the fiber and the optical cladding is increased relative to step-index optical fibers. That index difference makes it possible to shift the wavelength for which chromatic dispersion is zero towards the transmission wavelength; it is obtained by inserting dopants into the preform while said preform is being manufactured, e.g. by means of a Modified Chemical Vapor Deposition (MCVD) process which is known per se and not described in any more detail herein.

NZ-DSF+ is used to designate non-zero dispersion shifted fibers that have non-zero and positive chromatic dispersion for the wavelengths at which they are used. For those wavelengths, such fibers have low chromatic dispersion, typically less than 10 ps/nm.km at 1550 nm, and chromatic dispersion gradients in the range 0.04 ps/nm².km to 0.1 ps/nm².km.

In order to compensate for chromatic dispersion and for the chromatic dispersion gradient in SMF (single mode fiber) or NZ-DSF+ fibers used as line fibers, it is known that short lengths of dispersion-compensating fiber (DCF) can be used.

DCF fibers are described in various patents. In the vicinity of a wavelength of 1550 nm, they have negative chromatic dispersion so as to compensate for the cumulative chromatic dispersion in the line fiber, and, in addition, they can have negative chromatic dispersion gradients so as to compensate for the positive chromatic dispersion gradient of the line fiber.

Document WO-A-99 13366 proposes a dispersion-compensating fiber that is intended for use in compensation boxes for compensating the chromatic dispersion and the chromatic dispersion gradient of a fiber of the type sold by Lucent Technologies under the "True Wave" trademark. The "True Wave" fiber has chromatic dispersion in the range 1.5 ps/nm.km to 4 ps/nm.km and a chromatic dispersion gradient of 0.07 ps/nm².km. In the range 1530 nm to 1610 nm, the proposed dispersion-compensating fibers have chromatic dispersion of less than −6 ps/nm.km, a chromatic dispersion gradient of less than −0.6 ps/nm².km, and a ratio between those two values of less than 160. In order to compensate the dispersion in the line fiber, the dispersion-compensating fiber is used in a compensation box, the length of DCF used being 15 times shorter than the length of the line fiber.

French Patent Application filed on Feb. 18, 1999 under number 99 02 028, published under number FR-2 790 107, and entitled "Fibre de ligne pour systèmes de transmission à fibre optique à multiplexage en longueurs d'onde" ["Line fiber for WDM optical fiber transmission systems"] proposes a line fiber specially suited to dense wavelength division multiplexed transmission, with inter-channel spacing of 100 GHz or less for a data rate per channel of 10 Gbit/s. For a wavelength of 1550 nm, that fiber has an effective area greater than or equal to 60 µm², chromatic dispersion lying in the range 6 ps/nm.km to 10 ps/nm.km, and a chromatic dispersion gradient of less than 0.07 ps/nm².km.

Amongst the fibers of document WO-A 99 13366, and in particular amongst those described in the examples in that document, nothing points to the fibers offering the best compromise for compensating the chromatic dispersion and the chromatic dispersion gradient of NZ-DSF fibers, and in particular of the fibers described in document FR-2 790 107. In other words, it is not possible in document WO-A 99 13366 to determine the dispersion-compensating fibers which offer the best compromise between bend losses, effective area (in order to avoid non-linear effects), chromatic dispersion, and chromatic dispersion gradient.

SUMMARY OF THE INVENTION

The invention proposes a fiber suitable for in-line compensation of chromatic dispersion in a dispersion-shifted fiber, and more precisely in an NZ-DSF+ fiber, in particular in a fiber of the type described in document FR-2 790 107. It provides a fiber that has bend losses which are low, and that is easy to use as a line fiber in a transmission system.

More precisely the invention provides an optical fiber which, for a wavelength of 1550 nm, has chromatic dispersion that is negative and greater than −40 ps/nm.km, a chromatic dispersion to chromatic dispersion gradient ratio that is in the range 50 nm to 230 nm, the optical fiber being characterized in that is has an effective area that is greater than or equal to 10 µm²; bend losses that are less than or equal to 0.05 dB; and an ideal cutoff wavelength that is greater than or equal to 1.1 µm. The ideal cutoff wavelength is the calculated wavelength beyond which only the fundamental mode can be propagated (for more details, reference can be made to the work of L. B. Jeunhomme, entitled "Single-Mode Fiber Optics, principles and applications", 1990 edition, pages 39 to 44).

Choosing the ideal cutoff wavelength beyond 1.1 µm enables the desired compromise to be obtained.

In a preferred embodiment, for a wavelength of 1550 nm, the fiber has chromatic dispersion that is greater than or equal to −20 ps/nm.km.

In another preferred embodiment, for a wavelength of 1550 nm, the fiber has chromatic dispersion that is less than or equal to −5 ps/nm.km.

In another preferred embodiment, for a wavelength of 1550 nm, the fiber has a ratio between chromatic dispersion and chromatic dispersion gradient that is less than 200 nm, and that is preferably less than 180 nm, and that is more preferably less than 160 nm.

In another preferred embodiment, for a wavelength of 1550 nm, the fiber has a ratio between chromatic dispersion and chromatic dispersion gradient that is greater than 80 nm, and that is preferably greater than 100 nm, and that is more preferably greater than 120 nm.

In another preferred embodiment, for a wavelength of 1550 nm, the fiber has an effective area that is greater than or equal to 15 $\mu m^2$, and preferably greater than or equal to 20 $\mu m^2$.

In another preferred embodiment, for a wavelength of 1550 nm, the fiber has attenuation that is less than or equal to 0.3 dB/km.

In another preferred embodiment, for a wavelength of 1550 nm, the fiber has a mode diameter that is greater than or equal to 4 µm, and preferably greater than or equal to 5 µm. In another preferred embodiment, for a wavelength of 1550 nm, the fiber has a sensitivity to micro-bends that is less than or equal to 1, and preferably less than or equal to 0.5.

In another preferred embodiment, the fiber has an ideal cutoff wavelength that is greater than or equal to 1.3 µm.

In another preferred embodiment, the fiber has an in-cable cutoff wavelength that is less than or equal to 1.3 µm.

The cable cutoff wavelength is the cutoff wavelength measured on a fiber that is 20 m long (for more details reference can be made to the EIA/TIA-455-170 standard).

In another preferred embodiment, for wavelengths lying in the range 1300 nm to 1620 nm, the fiber has bend losses that are less than 0.05 dB, and preferably less than 5×10$^{-3}$ dB, for a winding of 100 turns with a radius of 30 mm.

In another preferred embodiment, the fiber has a rectangular index profile with a depressed zone and a ring.

In another preferred embodiment, the difference between the index at any point of the fiber and the index of the cladding is greater than or equal to −8×10$^{-3}$.

In another preferred embodiment, the difference between the index at any point of the fiber and the index of the cladding is greater than or equal to 28×10$^{-3}$, and preferably less than or equal to 20×10$^{-3}$.

The invention also provides the use of a fiber of the invention as a dispersion-compensating fiber in a wavelength division multiplexed optical fiber transmission system. Preferably, the dispersion-compensating fiber is part of a cable and used as a line fiber.

The invention further provides a wavelength division multiplexed optical fiber transmission system including a first segment of line fiber, and a second segment of line fiber of the invention.

In a preferred embodiment, for a wavelength of 1550 nm, the line fiber of the first segment has chromatic dispersion lying in the range 5 ps/nm.km to 11 ps/nm.km.

In another preferred embodiment, for a wavelength of 1550 nm, the line fiber of the first segment has a chromatic dispersion gradient less than or equal to 0.08 ps/nm$^2$.km.

In another preferred embodiment, the ratio of the length of the first segment to the length of the second segment is substantially the inverse of the absolute value of the ratio between the chromatic dispersions at 1550 nm of the fibers of the first segment and of the second segment.

In another preferred embodiment, the cumulative chromatic dispersion for each channel in the range 1530 nm to 1620 nm is less than 100 ps/nm, and preferably less than 50 ps/nm, on average over 100 km of transmission.

BRIEF DESCRIPTION OF THE DRAWINGS

Other characteristics and advantages of the invention will appear on reading the following description of embodiments of the invention, given by way of example and with reference to the accompanying drawings, in which.

DETAILED DESCRIPTION OF THE INVENTION

Figure 1:
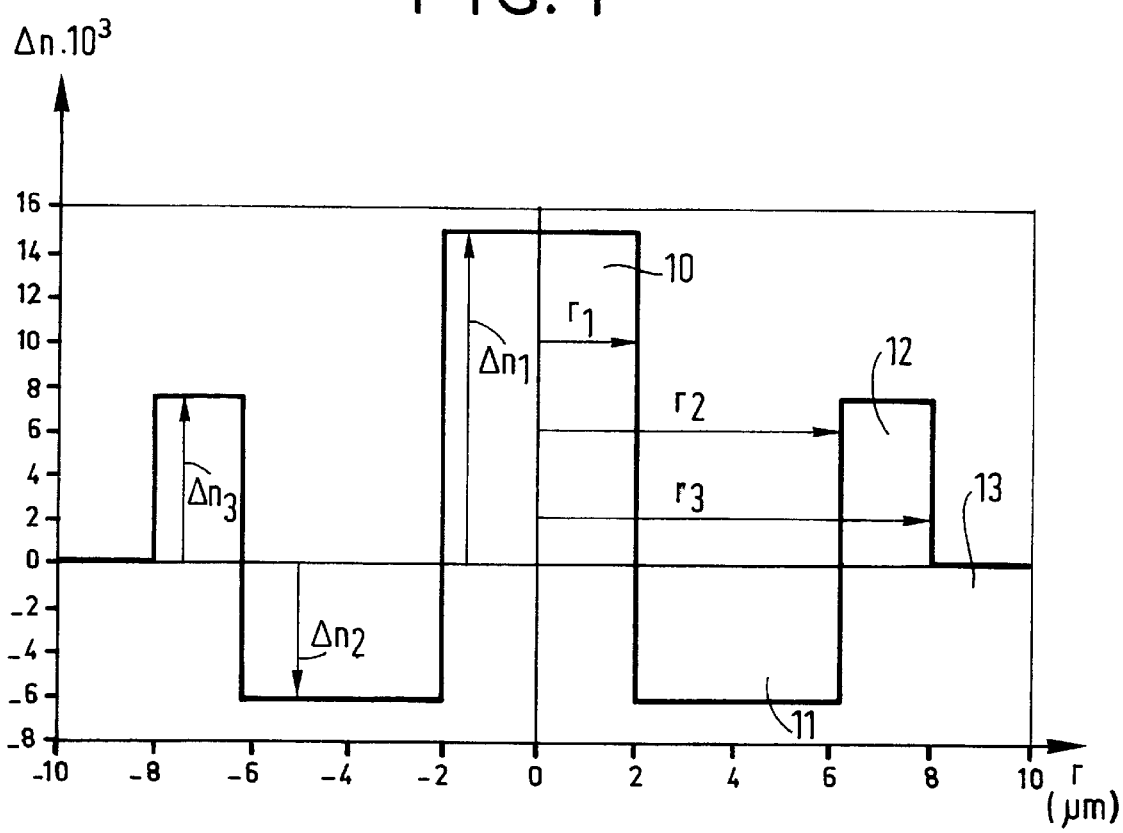
FIG. 1 is a diagram showing the reference index profile of a dispersion-compensating fiber of the invention.

The preferred characteristics of the fibers of the invention are as follows:

chromatic dispersion at 1550 nm that is negative and greater than or equal to −40 ps/nm.km, and preferably lying in the range −5 ps/nm.km to −20 ps/nm.km;

ratio between chromatic dispersion and chromatic dispersion gradient at 1550 nm that lies in the range 50 nm to 230 nm, and preferably in the range 80 nm to 200 nm, or even in the range 100 nm to 180 nm, or better still in the range 120 nm to 160 nm;

effective area at 1550 nm that is greater than 10 m$^2$, or even 15 $\mu m^2$, or preferably 20 $\mu m^2$;

sensitivity to micro-bends at 1550 nm that is less than or equal to 1, or preferably less than or equal to 0.5;

bend losses in the operating range (1300 nm to 1620 nm) that are less than or equal to 0.05 dB, and preferably less than 5×10$^{-3}$ dB for 100 turns with a radius of 30 mm;

ideal cutoff wavelength that is greater than 1.1 µm, and preferably greater than 1.3 µm;

in-cable cutoff wavelength that is preferably less than or equal to 1.3 µm; and mode diameter at 1550 nm that is greater than 4 µm, and preferably greater than 5 µm.

The preferred choices of the ideal cutoff wavelength and of the in-cable cutoff wavelength guarantee that, in the wavelength range 1300 nm to 1620 nm, the fiber is monomode, has good bend behavior, has an effective area that is as large as possible in order to avoid non-linear effects, and has a core that is as little doped as possible so as to limit attenuation problems. The choice of the cutoff wavelength thus results in a better compromise than for fibers described in document WO-A-99 13366.

The other preferred characteristics of the fiber improve the capacity to use the fiber of the invention for compensating, in line, the fiber proposed in above-mentioned French Application FR-2 790 107, or fibers of the same type. The fiber of the invention is particularly suitable for fibers having chromatic dispersion lying in the range 5 ps/nm.km to 11 ps/nm.km, and chromatic dispersion gradients less than 0.08 ps/nm².km.

The fiber of the invention makes it possible to constitute very high data rate WDM transmission systems, and makes it possible, for example, to achieve data rates of N×20 Gb/s or of N×40 Gb/s.

In a manner known per se, bend losses were evaluated by measuring the losses induced in a fiber by winding 100 turns of the fiber around a reel of radius 30 mm. Sensitivity to micro-bends was evaluated relatively, relative to the fiber sold by the Applicant under reference ASMF 200; it is possible to use the known method of crushing the fiber between two grids.

With reference to FIG. 1, examples are given below of fiber profiles that make it possible to obtain such values. All of the fibers given by way of example have reference profiles of the type shown in FIG. 1, and vary by the numerical values of the radii and of the refractive indices. FIG. 1 is thus a diagram showing the reference index profile of a fiber of the invention.

The index profile is of the rectangular-profile type, with a buried zone and a ring, and, starting from the center of the fiber, said profile has:

a central portion 10 of radius $r_1$ with a substantially constant index that is greater than or equal to the index of the cladding, and preferably having an index difference $\Delta n_1$ relative to the cladding 13 that is less than $28 \times 10^{-3}$; a small value for this index difference makes it easier to obtain fibers having low attenuation;

a buried or depressed zone 11 of radius $r_2$ of index less than or equal to the index of the cladding 13, and preferably having an index difference $\Delta n_2$ relative to the cladding 13 that is greater than $-8 \times 10^{-3}$; such a minimum value for the index difference making it easier to manufacture the fiber; and a ring 12 of radius $r_3$, i.e. a portion of index greater than the index of the cladding 13, hence the description of the profile as "rectangular with a buried zone and a ring".

The cladding 13 of the fiber extends around the ring, the index differences being measured relative to said cladding.

The values for the refractive indices and radii of the fibers are given in Table 1 below, for seven embodiments of the fiber of the invention. The outside radii respectively of the central portion 10, of the depressed zone 11 and of the ring 12, are referenced $r_1$, $r_2$, and $r_3$. These radii are given in micrometers in Table 1. The respective differences between the index of the cladding 13 of the fiber and the indices of the central portion 10, of the depressed zone 11 and of the ring 12 are referenced $\Delta n_1$, $\Delta n_2$, and $\Delta n_3$.

TABLE 1

| No. | $r_1$ | $r_2$ | $r_3$ | $10^3 \cdot \Delta n_1$ | $10^3 \cdot \Delta n_2$ | $10^3 \cdot \Delta n_3$ |
|---|---|---|---|---|---|---|
| 1 | 2.01 | 6.20 | 8.05 | 14.9 | −6.2 | 7.5 |
| 2 | 2.42 | 5.76 | 8.35 | 12.1 | −6.8 | 5.0 |
| 3 | 2.12 | 5.78 | 7.05 | 14.6 | −8.0 | 8.0 |
| 4 | 2.70 | 5.92 | 8.45 | 10.4 | −6.1 | 4.8 |
| 5 | 2.38 | 5.69 | 7.20 | 12.4 | −7.1 | 5.6 |
| 6 | 2.59 | 5.53 | 8.64 | 10.8 | −5.9 | 4.0 |
| 7 | 2.29 | 6.16 | 8.80 | 13.1 | −8.0 | 5.0 |

The profile of FIG. 1, associated with the values of Table 1, makes it possible to obtain a fiber having the characteristics given in Table 2 below. In table 2, $\lambda_{cth}$ designates the ideal cutoff wavelength of the fiber. In practice, the effective cutoff wavelength in compliance with Standard ITU-T G650 and the wavelength as measured in-cable are a few hundred nm shorter; it can be understood that the fiber is effectively monomode in the range of wavelengths of the signals used, e.g. from 1300 nm to 1620 nm.

$A_{eff}$ designates the effective area, C designates the chromatic dispersion as measured at 1550 nm and expressed in ps/nm.km, dC/dλ designates the chromatic dispersion gradient as measured at 1550 nm and expressed in ps/nm².km, C/(dC/dλ) designates the ratio between these two quantities, $2W_{02}$ designates the mode diameter at 1550 nm, PC designates the bend losses evaluated as explained above, and $S_{\mu c}$ designates sensitivity to micro-bends measured as explained above at 1550 nm.

TABLE 2

| No. | $\lambda_{cth}$ (nm) | $A_{eff}$ (μm²) | C (ps/nm/km) | dC/dλ (ps/nm²/km) | C/(dC/dλ) (nm) | $2W_{02}$ (μm) | PC @1550 nm (dB) | PC @1620 nm (dB) | $S_{\mu C}$ |
|---|---|---|---|---|---|---|---|---|---|
| 1 | 1788 | 21.8 | −33.2 | −0.243 | 137 | 5.26 | $<10^{-5}$ | $7 \times 10^{-3}$ | 0.3 |
| 2 | 1783 | 26.7 | −16.7 | −0.121 | 138 | 5.78 | $<10^{-5}$ | $<5 \times 10^{-3}$ | 0.29 |
| 3 | 1626 | 20.3 | −15.8 | −0.113 | 140 | 5.09 | $<10^{-5}$ | $<5 \times 10^{-3}$ | 0.21 |
| 4 | 1781 | 32.0 | −8.4 | −0.059 | 142 | 6.32 | $<10^{-5}$ | $<5 \times 10^{-3}$ | 0.35 |
| 5 | 1547 | 24.6 | −8.6 | −0.061 | 141 | 5.59 | $<10^{-5}$ | $<5 \times 10^{-3}$ | 0.26 |
| 6 | 1771 | 32.4 | −16.1 | −0.072 | 224 | 6.34 | $<10^{-5}$ | $<5 \times 10^{-3}$ | 0.4 |
| 7 | 1788 | 22.4 | −12.7 | −0.157 | 81 | 5.32 | $<10^{-5}$ | $2 \times 10^{-2}$ | 0.31 |

The bend losses remain less than $5 \times 10^{-2}$ dB for 100 turns of fiber around a reel of radius 30 mm throughout the working range for the fiber, i.e. from 1300 nm to 1620 nm.

In all of the examples in Table 1, variations of 5% in the index $\Delta n_1$ of the central portion 10, or of 10% in the indices $\Delta n_2$ and $\Delta n_3$ of the buried zone 11 and of the ring 12 make it possible to obtain similar results. The same applies to the radii which can vary individually by 5% relative to the values given in the example of the figures, while obtaining analogous results.

In all cases, regardless of the shape of the index profile, the variations in index relative to the cladding 13 lie in the range $-8 \times 10^{-3}$ to $28 \times 10^{-3}$; these choices guarantee that the fiber remains simple to manufacture, and that the attenuation is limited. Preferably, it is possible to make the index difference relative to the index of the cladding 13 less than $20 \times 10^{-3}$ at all points.

More generally, by varying the following parameters in the ranges indicated below, fibers are obtained having the characteristics of the invention and the reference profile shown in FIG. 1:

$10 \times 10^{-3} \leq \Delta n_1 \leq 16 \times 10^{-3}$ and $1.85 \, \mu m \leq r_1 \leq 2.85 \, \mu m$ and preferably:

$-8 \times 10^{-3} \leq \Delta n_2 \leq -4 \times 10^{-3}$ and $4.8 \, \mu m \leq r_2 \leq 7.25 \, \mu m$ and even more preferably:

$2 \times 10^{-3} \leq \Delta n_3 \leq 8 \times 10^{-3}$ and $6.6 \, \mu m \leq r_3 \leq 9.5 \, \mu m$.

In addition, the optimized profiles for obtaining the characteristics of the invention satisfy the following relationships, where S is defined by $$S = 2 \times \int_o^{+r_1} \Delta n(r) \cdot r \, dr :$$

Figure 2:
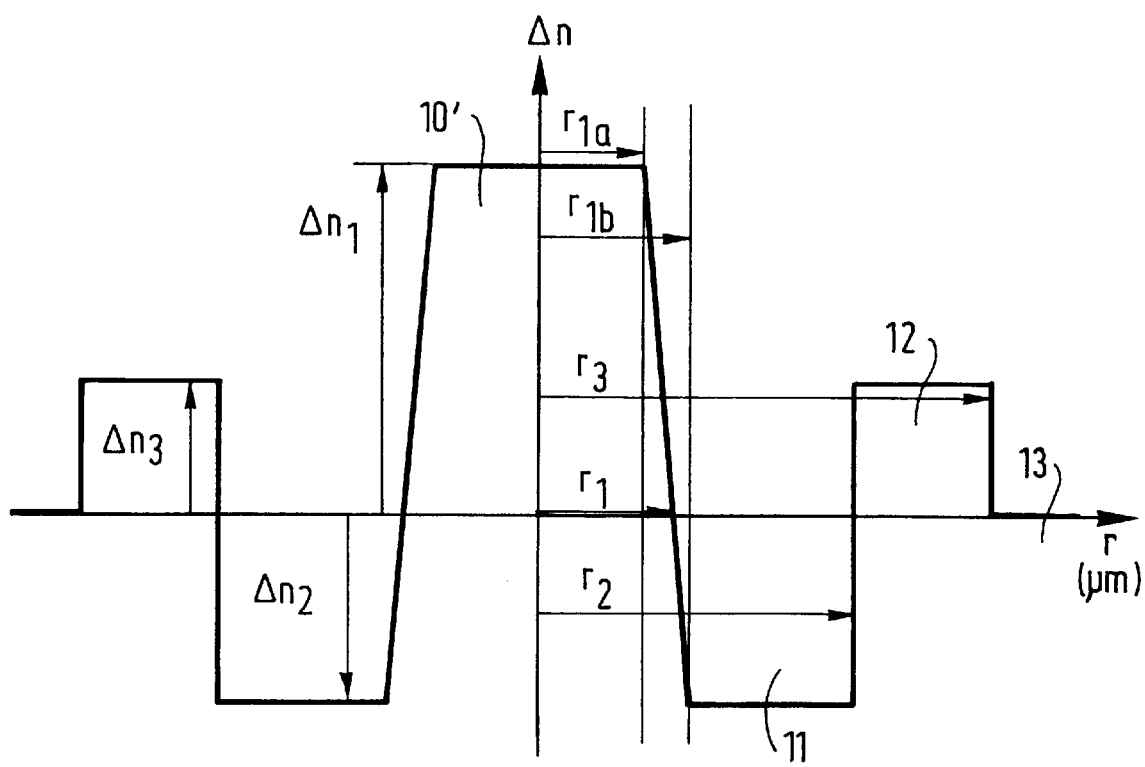
FIG. 2 is a diagram showing the reference index profile of a dispersion-compensating fiber of a second embodiment of the invention.

$55.6 \times 10^{-3} \, \mu m^2 \leq S \leq 84.6 \times 10^{-3} \, \mu m^2$ $-319 \times 10^{-3} \, \mu m^2 \leq (r_2)^2 \times \Delta n_2 \leq -157 \times 10^{-3} \, \mu m^2$ $6.9 \times 10^{-3} \, \mu m \leq (r_3 - r_2) \times \Delta n_3 \leq 14.75 \times 10^{-3}$ FIG. 2 is a diagram showing the reference index profile of a fiber of a second embodiment of the invention. The index profile is of the trapezium-profile type, with a buried zone and a ring. The only difference between this profile and the profile shown in FIG. 1 resides in the fact that the central portion 10' is trapezium shaped and not rectangular shaped, with a minimum radius $r_{1a}$, a maximum radius $r_{1b}$, and a radius $r_1$ corresponding to the radius of the central portion at the point where it crosses the abscissa.

The parameters and characteristics of a fiber of the invention having a profile of the type shown in FIG. 2 are given below in tables 3 and 4.

TABLE 3

| $r_{1a}/r_{1b}$ | $r_1$ | $r_2$ | $r_3$ | $10^3 \cdot \Delta n_1$ | $10^3 \cdot \Delta n_2$ | $10^3 \cdot \Delta n_3$ |
|---|---|---|---|---|---|---|
| 0.7 | 2.48 | 5.88 | 8.4 | 13 | −7 | 5 |

TABLE 4

| $\lambda_{cth}$ (nm) | $A_{eff}$ ($\mu m^2$) | C (ps/nm/km) | $dC/d\lambda$ (ps/nm$^2$/km) | $C/(dC/d\lambda)$ (nm) | $2W_{02}$ ($\mu m$) | PC @1550 nm (dB) | PC @1620 nm (dB) | $S_{\mu C}$ |
|---|---|---|---|---|---|---|---|---|
| 1788 | 24.4 | −12.4 | −0.102 | 122 | 5.58 | <10$^{-5}$ | 1 × 10$^{-4}$ | 0.19 |

The parameter ranges defined above also apply to the index profile in FIG. 2 (with $r_1$ taking the new definition given above). A range is added to said ranges that enables the ratio $r_{1a}/r_{1b}$ to be defined:

$0.6 \leq r_{1a}/r_{1b} \leq 1$.

Figure 3:
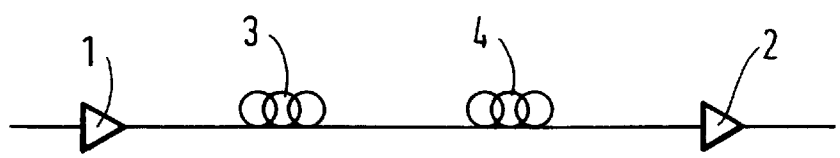
FIG. 3 is a diagram showing a segment of a transmission system using the dispersion-compensating fiber of the invention.

FIG. 3 is a diagram showing a portion of a transmission system, in which the compensation fiber of the invention is used as a line fiber. FIG. 3 shows two adjacent amplifiers 1 and 2 of the transmission system. Between the two amplifiers, the line fiber is constituted by a segment 3 of fiber of the type of the above-mentioned French Patent Application, and by a second segment 4 of fiber of the invention. The fiber of the first segment has chromatic dispersion at 1550 nm of 8 ps/nm.km, and a chromatic dispersion gradient at the same wavelength of 0.058 ps/nm$^2$.km. By way of example, the use in the second segment constituted by a dispersion-compensating fiber as in embodiment No. 2 described in Tables 1 and 2 makes it possible, over the range of wavelengths of the multiplex, to compensate for the cumulative chromatic dispersion in the first segment of fiber. In this case, the dispersion-compensating fiber has a ratio between the chromatic dispersion and the chromatic dispersion gradient of 138 nm. The line fiber of the first segment has a ratio between the chromatic dispersion and the chromatic dispersion gradient of 138 nm.

The ratio between the respective lengths of the fibers of the first and second segments is chosen so as to minimize the cumulative chromatic dispersion of the link, and, in the example, may be about 2, i.e. in the vicinity of the inverse of the chromatic dispersion ratio.

In such a case, for a first segment of fiber of length 68 km, and a second segment of compensation fiber of 32 km, the cumulative chromatic dispersion for the channel at 1550 nm of the multiplex is close to 0 ps/nm.

In the range of the multiplex, i.e. from 1530 nm to 1620 nm, the cumulative chromatic dispersion is less than 50 ps/nm for each channel, for the 100 km of the first and second segments. In this way, it is possible to limit the cumulative chromatic dispersion to values less than 100 ps/nm, for each channel, on average over 100 km, as indicated above.

The fibers of the invention may be manufactured by a person skilled in the art using known techniques, such as MCVD, or other techniques commonly used for manufacturing optical fibers.

Naturally, the present invention is not limited to the examples and embodiments described and shown, but rather numerous variants of it are accessible to the person skilled in the art. Clearly, the profiles shown in FIGS. 1 and 2 and the examples of the radii and of the indices are given only by way of example, and other profiles may make it possible to obtain fibers having the characteristics of the invention. The fibers of the invention may be used as in the embodiment shown in FIG. 3, in a transmission system having repeaters, but it may also be used in a transmission system without repeaters.

What is claimed is:

1. An optical fiber which, for a wavelength of 1550 nm, has chromatic dispersion that is negative and greater than −40 ps/nm.km, a chromatic dispersion to chromatic dispersion gradient ratio that lies in the range 50 nm to 230 nm, the optical fiber being characterized in that it has an effective area that is greater than or equal to 10 $\mu m^2$, and bend losses that are less than or equal to 0.05 dB; and an ideal cutoff wavelength that is greater than or equal to 1.1 $\mu m$; and wherein the difference between the index at any point of the fiber and the index of the cladding is greater than or equal to $-8\times10^{-3}$.

2. A fiber according to claim 1, characterized in that, for a wavelength of 1550 nm, it has chromatic dispersion that is greater than or equal to −20 ps/nm.km.

3. The fiber according to claim 2, characterized in that, for a wavelength of 1550 nm, the fiber has a ratio between the chromatic dispersion and the chromatic dispersion gradient that is greater than 80 nm.

4. The fiber according to claim 2, characterized in that, for a wavelength of 1550 nm, the fiber has a ratio between the chromatic dispersion and the chromatic dispersion gradient that is greater than 100 nm.

5. The fiber according to claim 2, characterized in that, for a wavelength of 1550 nm, the fiber has a ratio between the chromatic dispersion and the chromatic dispersion gradient that is greater than 120 nm.

6. A fiber according to claim 1, characterized in that, for a wavelength of 1550 nm, it has chromatic dispersion that is less than or equal to −5 ps/nm.km.

7. A fiber according to claim 1, characterized in that, for a wavelength of 1550 nm, it has a ratio between the chromatic dispersion and the chromatic dispersion gradient that is less than 200 nm, and that is preferably less than 180 nm.

8. A fiber according to claim 7, characterized in that, for a wavelength of 1550 nm, it has a ratio between the chromatic dispersion and the chromatic dispersion gradient that is less than 160 nm.

9. A fiber according to claim 1, characterized in that, for a wavelength of 1550 nm, it has a ratio between the chromatic dispersion and the chromatic dispersion gradient that is greater than 80 nm and that is preferably greater than 100 nm.

10. A fiber according to claim 9, characterized in that, for a wavelength of 1550 nm, it has a ratio between the chromatic dispersion and the chromatic dispersion gradient that is greater than 120 nm.

11. A fiber according to claim 1, characterized in that, for a wavelength of 1550 nm, it has an effective area that is greater than or equal to 15 $\mu m^2$, and preferably greater than or equal to 20 $\mu m^2$.

12. A fiber according to claim 1, characterized in that, for a wavelength of 1550 nm, it has attenuation that is less than or equal to 0.3 dB/km.

13. A fiber according to claim 1, characterized in that, for a wavelength of 1550 nm, it has a mode diameter that is greater than or equal to 4 $\mu m$, and preferably greater than or equal to 5 $\mu m$.

14. A fiber according to claim 1, characterized in that, for a wavelength of 1550 nm, it has a sensitivity to micro-bends that is less than or equal to 1, and preferably less than or equal to 0.5.

15. A fiber according to claim 1, characterized in that it has an ideal cutoff wavelength that is greater than or equal to 1.3 $\mu m$.

16. A fiber according to claim 1, characterized in that it has an in-cable cutoff wavelength that is less than or equal to 1.3 $\mu m$.

17. A fiber according to claim 1, characterized in that, for wavelengths lying in the range 1300 nm to 1620 nm, it has bend losses that are less than 0.05 dB, and preferably less than $5\times10^{-3}$ dB.

18. A fiber according to claim 1, characterized in that the difference between the index at any point of the fiber and the index of the cladding is less than or equal to $28\times10^{-3}$, and preferably less than or equal to $20\times10^{-3}$.

19. A fiber according to claim 1, characterized in that is includes a core surrounded by optical cladding, said core presenting an index profile with a depressed zone and a ring, the fiber comprising:
- a central portion (10, 10') of index that is greater than or equal to the index of said cladding (13), and having a maximum index difference $\Delta n_1$ relative to said cladding (13);
- a buried or depressed zone (11) of radius $r_2$ of index less than or equal to the index of said cladding (13), and having an index difference $\Delta n_2$ relative to said cladding 13; and
- a ring (12) of radius $r_3$ of index greater than the index of said cladding (13), and having a maximum index difference $\Delta n_3$ relative to said cladding (13).

20. A fiber according to claim 19, characterized in that said central portion (10) of radius $r_1$ has an index profile that is rectangular shaped, and in that its index difference $\Delta n_1$ relative to said cladding (13) is substantially constant.

21. A fiber according to claim 20, characterized in that:
$10\times10^{-3} \leq \Delta n_1 \leq 16\times10^{-3}$ and $1.85\ \mu m \leq r_1 \leq 2.85\ \mu m$.

22. A fiber according to claim 21, characterized in that:
$-8\times10^{-3} \leq \Delta n_2 \leq -4\times10^{-3}$ and $4.8\ \mu m \leq r_2 \leq 7.25\ \mu m$.

23. A fiber according to claim 22, characterized in that:
$2\times10^{-3} \leq \Delta n_3 \leq 8\times10^{-3}$ and $6.6\ \mu m \leq r_3 \leq 9.5\ \mu m$.

24. A fiber according to claim 23, characterized in that S being defined by:

$$S = 2 \times \int_0^{+r_1} \Delta n(r) \cdot r\, dr,$$

it satisfies the following relationships:

$55.6\times10^{-3}\ \mu m^2 \leq S \leq 84.6\times10^{-3}\ \mu m^2$ $-319\times10^{-3}\ \mu m^2 \leq (r_2)^2 \times \Delta n_2 \leq -157\times10^{-3}\ \mu m^2$ $6.9\times10^{-3}\ \mu m \leq (r_3-r_2) \times \Delta n_3 \leq 14.75\times10^{-3}$.

25. A fiber according to claim 19, characterized in that said central portion (10') is trapezium shaped, of minimum radius $r_{1a}$, of maximum radius $r_{1b}$, and whose radius at the point where it crosses the abscissa is referenced $r_1$.

26. The use of a fiber according to claim 1 as a dispersion-compensating fiber in a wavelength division multiplexed optical fiber transmission system.

27. The use according to claim 26, with the dispersion-compensating fiber being part of a cable and used as a line fiber.

28. A wavelength division multiplexed optical fiber transmission system including a first segment (3) of line fiber, and a second segment (4) of line fiber according to claim 1.

29. A system according to claim 28, characterized in that, for a wavelength of 1550 nm, the line fiber of the first segment has chromatic dispersion lying in the range 5 ps/nm.km to 11 ps/nm.km.

30. A system according to claim 28, characterized in that, for a wavelength of 1550 nm, the line fiber of the first segment has a chromatic dispersion gradient less than or equal to 0.08 ps/$nm^2$.km.

31. A system according to claim 28, characterized in that the ratio of the length of the first segment to the length of the second segment is substantially the inverse of the absolute value of the ratio between the chromatic dispersions at 1550 nm of the fibers of the first segment and of the second segment.

32. A system according to claim 28, characterized in that the cumulative chromatic dispersion for each channel in the range 1530 nm to 1620 nm is less than 100 ps/nm, and preferably less than 50 ps/nm, on average over 100 km of transmission.

33. An optical fiber which, for a wavelength of 1550 nm, has chromatic dispersion that is negative and greater than −40 ps/nm.km, a chromatic dispersion to chromatic dispersion gradient ratio that lies in the range 50 nm to 230 nm, the optical fiber being characterized in that it has an effective area that is greater than or equal to 10 $\mu m^2$, and bend losses that are less than or equal to 0.05 dB; and an ideal cutoff wavelength that is greater than or equal to 1.1 $\mu m$; and
wherein the difference between the index at any point of the fiber and the index of the cladding is less than or equal to $28 \times 10^{-3}$, and preferably less than or equal to $20 \times 10^{-3}$.

34. A fiber according to claim 33, characterized in that, for a wavelength of 1550 nm, it has chromatic dispersion that is greater than or equal to −20 ps/nm.km.

35. A fiber according to claim 33, characterized in that, for a wavelength of 1550 nm, it has chromatic dispersion that is less than or equal to −5 ps/nm.km.

36. A fiber according to claim 33, characterized in that, for a wavelength of 1550 nm, it has a ratio between the chromatic dispersion and the chromatic dispersion gradient that is less than 200 nm, and that is preferably less than 180 nm.

37. A fiber according to claim 33, characterized in that, for a wavelength of 1550 nm, it has a ratio between the chromatic dispersion and the chromatic dispersion gradient that is less than 160 nm.

38. A fiber according to claim 33, characterized in that, for a wavelength of 1550 nm, it has a ratio between the chromatic dispersion and the chromatic dispersion gradient that is greater than 80 nm and that is preferably greater than 100 nm.

39. A fiber according to claim 33, characterized in that, for a wavelength of 1550 nm, it has a ratio between the chromatic dispersion and the chromatic dispersion gradient that is greater than 120 nm.

40. A fiber according to claim 33, characterized in that, for a wavelength of 1550 nm, it has an effective area that is greater than or equal to 15 $\mu m^2$, and preferably greater than or equal to 20 $\mu m^2$.

41. A fiber according to claim 33, characterized in that, for a wavelength of 1550 nm, it has attenuation that is less than or equal to 0.3 dB/km.

42. A fiber according to claim 33, characterized in that, for a wavelength of 1550 nm, it has a mode diameter that is greater than or equal to 4 $\mu m$, and preferably greater than or equal to 5 $\mu m$.

43. A fiber according to claim 33, characterized in that, for a wavelength of 1550 nm, it has a sensitivity to micro-bends that is less than or equal to 1, and preferably less than or equal to 0.5.

44. A fiber according to claim 33, characterized in that it has an ideal cutoff wavelength that is greater than or equal to 1.3 $\mu m$.

45. A fiber according to claim 33, characterized in that it has an in-cable cutoff wavelength that is less than or equal to 1.3 $\mu m$.

46. A fiber according to claim 33, characterized in that, for wavelengths lying in the range 1300 nm to 1620 nm, it has bend losses that are less than 0.05 dB, and preferably less than $5 \times 10^{-3}$ dB.

47. A fiber according to claim 33, characterized in that is includes a core surrounded by optical cladding, said core presenting an index profile with a depressed zone and a ring, the fiber comprising:
a central portion (10, 10') of index that is greater than or equal to the index of said cladding (13), and having a maximum index difference $\Delta n_1$ relative to said cladding (13);
a buried or depressed zone (11) of radius $r_2$ of index less than or equal to the index of said cladding (13), and having an index difference $\Delta n_2$ relative to said cladding 13; and
a ring (12) of radius $r_3$ of index greater than the index of said cladding (13), and having a maximum index difference $\Delta n_3$ relative to said cladding (13);
and characterized in that said central portion (10) of radius $r_1$ has an index profile that is rectangular shaped, and in that its index difference $\Delta n_1$ relative to said cladding (13) is substantially constant.

48. A fiber according to claim 33, characterized in that it includes a core surrounded by optical cladding, said core presenting an index profile with a depressed zone and a ring, the fiber comprising:
a central portion (10, 10') of index that is greater than or equal to the index of said cladding (13), and having a maximum index difference $\Delta n_1$ relative to said cladding (13);
a buried or depressed zone (11) of radius $r_2$ of index less than or equal to the index of said cladding (13), and having an index difference $\Delta n_2$ relative to said cladding 13; and
a ring (12) of radius $r_3$ of index greater than the index of said cladding (13), and having a maximum index difference $\Delta n_3$ relative to said cladding (13); and wherein
said central portion (10') is trapezium shaped, of minimum radius $r_{1a}$, of maximum radius $r_{1b}$, and whose radius at the point where it crosses the abscissa is referenced $r_1$.

49. The use of a fiber according to claim 33 as a dispersion-compensating fiber in a wavelength division multiplexed optical fiber transmission system.

50. The use according to claim 33, with the dispersion-compensating fiber being part of a cable and used as a line fiber.

51. A wavelength division multiplexed optical fiber transmission system including a first segment (3) of line fiber, and a second segment (4) of line fiber according to claim 33.

52. A system according to claim 33, characterized in that, for a wavelength of 1550 nm, the line fiber of the first segment has chromatic dispersion lying in the range 5 ps/nm.km to 11 ps/nm.km.

53. A system according to claim 33, characterized in that, for a wavelength of 1550 nm, the line fiber of the first segment has a chromatic dispersion gradient less than or equal to 0.08 ps/nm$^2$.km.

54. A system according to claim 33, characterized in that the ratio of the length of the first segment to the length of the second segment is substantially the inverse of the absolute value of the ratio between the chromatic dispersions at 1550 nm of the fibers of the first segment and of the second segment.

55. A system according to claim 33, characterized in that the cumulative chromatic dispersion for each channel in the range 1530 nm to 1620 nm is less than 100 ps/nm, and preferably less than 50 ps/nm, on average over 100 km of transmission.

56. The fiber according to claim 33, characterized in that, for a wavelength of 1550 nm, the fiber has a ratio between the chromatic dispersion and the chromatic dispersion gradient that is greater than 80 nm.

57. The fiber according to claim 33, characterized in that, for a wavelength of 1550 nm, the fiber has a ratio between the chromatic dispersion and the chromatic dispersion gradient that is greater than 100 nm.

58. The fiber according to claim 33, characterized in that, for a wavelength of 1550 nm, the fiber has a ratio between the chromatic dispersion and the chromatic dispersion gradient that is greater than 120 nm.

59. An optical fiber which, for a wavelength of 1550 nm, has chromatic dispersion that is negative and greater than −40 ps/nm.km, a chromatic dispersion to chromatic dispersion gradient ratio that lies in the range 50 nm to 230 nm, the optical fiber being characterized in that it has an effective area that is greater than or equal to 10 $\mu m^2$, and bend losses that are less than or equal to 0.05 dB; and an ideal cutoff wavelength that is greater than or equal to 1.1 $\mu m$; and wherein the fiber includes a core surrounded by optical cladding, said core presenting an index profile with a depressed zone and a ring, the fiber comprising:

a central portion (10, 10') of index that is greater than or equal to the index of said cladding (13), and having a maximum index difference $\Delta n_1$ relative to said cladding (13);

a buried or depressed zone (11) of radius $r_2$ of index less than or equal to the index of said cladding (13), and having an index difference $\Delta n_2$ relative to said cladding 13; and a ring (12) or radius $r_3$ of index greater than the index of said cladding (13), and having a maximum index difference $\Delta n_3$ relative to said cladding (13);

wherein one of the following is satisfied:
  a) said central portion (10) of radius $r_1$ has an index profile that is rectangular shaped, and in that its index difference $\Delta n_1$ relative to said cladding (13) is substantially constant; and
  b) said central portion (10') is trapezium shaped, of minimum radius $r_{1a}$, of maximum radius $r_{1b}$, and whose radius at the point where it crosses the abscissa is referenced $r_1$; and wherein the following relationships are satisfied:

$10\times10^{-3} \leq \Delta n_1 \leq 16\times10^{-3}$ and $1.85\ \mu m \leq r_1 \leq 2.85\ \mu m$;

$-8\times10^{-3} \leq \Delta n_2 \leq -4\times10^{-3}$ and $4.8\ \mu m \leq r_2 \leq 7.25\ \mu m$;

and $2\times10^{-3} \leq \Delta n_3 \leq 8\times10^{-3}$ and $6.6\ \mu m \leq r_3 \leq 9.5\ \mu m$.

60. A fiber according to claim 59, characterized in that, for a wavelength of 1550 nm, it has chromatic dispersion that is greater than or equal to −20 ps/nm.km.

61. A fiber according to claim 59, characterized in that, for a wavelength of 1550 nm, it has chromatic dispersion that is less than or equal to −5 ps/nm.km.

62. A fiber according to claim 59, characterized in that, for a wavelength of 1550 nm, it has a ratio between the chromatic dispersion and the chromatic dispersion gradient that is less than 200 nm, and that is preferably less than 180 nm.

63. A fiber according to claim 59, characterized in that, for a wavelength of 1550 nm, it has a ratio between the chromatic dispersion and the chromatic dispersion gradient that is less than 160 nm.

64. A fiber according to claim 59, characterized in that, for a wavelength of 1550 nm, it has a ratio between the chromatic dispersion and the chromatic dispersion gradient that is greater than 80 nm and that is preferably greater than 100 nm.

65. A fiber according to claim 59, characterized in that, for a wavelength of 1550 nm, it has a ratio between the chromatic dispersion and the chromatic dispersion gradient that is greater than 120 nm.

66. A fiber according to claim 59, characterized in that, for a wavelength of 1550 nm, it has an effective area that is greater than or equal to 15 $\mu m^2$, and preferably greater than or equal to 20 $\mu m^2$.

67. A fiber according to claim 59, characterized in that, for a wavelength of 1550 nm, it has attenuation that is less than or equal to 0.3 dB/km.

68. A fiber according to claim 59, characterized in that, for a wavelength of 1550 nm, it has a mode diameter that is greater than or equal to 4 $\mu m$, and preferably greater than or equal to 5 $\mu m$.

69. A fiber according to claim 59, characterized in that, for a wavelength of 1550 nm, it has a sensitivity to micro-bends that is less than or equal to 1, and preferably less than or equal to 0.5.

70. A fiber according to claim 59, characterized in that it has an ideal cutoff wavelength that is greater than or equal to 1.3 $\mu m$.

71. A fiber according to claim 59, characterized in that it has an in-cable cutoff wavelength that is less than or equal to 1.3 $\mu m$.

72. A fiber according to claim 59, characterized in that, for wavelengths lying in the range 1300 nm to 1620 nm, it has bend losses that are less than 0.05 dB, and preferably less than $5\times10^{-3}$ dB.

73. A fiber according to claim 59, characterized in that said central portion (10) of radius $r_1$ has an index profile that is rectangular shaped, and in that its index difference $\Delta n_1$ relative to said cladding (13) is substantially constant.

74. A fiber according to claim 59, characterized in that said central portion (10') is trapezium shaped, of minimum radius $r_{1a}$, of maximum radius $r_{1b}$, and whose radius at the point where it crosses the abscissa is referenced $r_1$.

75. The use of a fiber according to claim 59 as a dispersion-compensating fiber in a wavelength division multiplexed optical fiber transmission system.

76. The use according to claim 59, with the dispersion-compensating fiber being part of a cable and used as a line fiber.

77. A wavelength division multiplexed optical fiber transmission system including a first segment (3) of line fiber, and a second segment (4) of line fiber according to claim 59.

78. A system according to claim 59, characterized in that, for a wavelength of 1550 nm, the line fiber of the first segment has chromatic dispersion lying in the range 5 ps/nm.km to 11 ps/nm.km.

79. A system according to claim 59, characterized in that, for a wavelength of 1550 nm, the line fiber of the first segment has a chromatic dispersion gradient less than or equal to 0.08 ps/nm².km.

80. A system according to claim 59, characterized in that the ratio of the length of the first segment to the length of the second segment is substantially the inverse of the absolute value of the ratio between the chromatic dispersions at 1550 nm of the fibers of the first segment and of the second segment.

81. A system according to claim 59, characterized in that the cumulative chromatic dispersion for each channel in the range 1530 nm to 1620 nm is less than 100 ps/nm, and preferably less than 50 ps/nm, on average over 100 km of transmission.

82. The fiber according to claim 59, characterized in that, for a wavelength of 1550 nm, the fiber has a ratio between the chromatic dispersion and the chromatic dispersion gradient that is greater than 80 nm.

83. The fiber according to claim 59, characterized in that, for a wavelength of 1550 nm, the fiber has a ratio between the chromatic dispersion and the chromatic dispersion gradient that is greater than 100 nm.

84. The fiber according to claim 59, characterized in that, for a wavelength of 1550 nm, the fiber has a ratio between the chromatic dispersion and the chromatic dispersion gradient that is greater than 120 nm.

* * * * *